May 10, 1932.  L. OLDFIELD  1,857,656

TWO-STROKE CYCLE INTERNAL COMBUSTION ENGINE

Filed Sept. 26, 1928  5 Sheets-Sheet 1

Inventor:
Lee Oldfield
by: Charles W. Hills
Attys.

May 10, 1932.  L. OLDFIELD  1,857,656
TWO-STROKE CYCLE INTERNAL COMBUSTION ENGINE
Filed Sept. 26, 1928  5 Sheets-Sheet 3

Inventor:
Lee Oldfield.
by: Charles W. Hill
Attys.

Patented May 10, 1932

1,857,656

UNITED STATES PATENT OFFICE

LEE OLDFIELD, OF CHICAGO, ILLINOIS

TWO STROKE CYCLE INTERNAL COMBUSTION ENGINE

Application filed September 26, 1928. Serial No. 308,357.

This invention relates to a two cycle barrel type of wabble plate internal combustion engine of the high speed supercharged type.

It is an object of this invention to provide an improved engine of the type described having a positive displacement supercharger mechanism operated in synchronism with the power pistons to deliver a fixed and predetermined supercharge ratio. I am aware that supercharged engines have been proposed heretofore including step piston scavenging two stroke cycle engines and blower type supercharged engines, but my present invention relates to an improvement over both forms in providing an engine having a positive supercharging and scavenging system operatively connected to the power pistons.

It is also an object of this invention to provide an improved multicylinder compressor having a valve mechanism common to all of the cylinders and acting as a floating separator between the intake and discharge passages of said cylinders whereby a single disc-like member floating on an eccentric pin on the main shaft successively controls both the intake to and discharge from each cylinder through multipurpose ports in each cylinder.

It is another object of this invention to provide an improved form of barrel type two stroke cycle engine of the uniflow type having intake and exhaust ports in the opposed cylinders adapted to be uncovered by the pistons near the ends of their outward movement. In one form of this invention the pistons at one end are connected to a swash plate or wabble plate and the pistons at the opposite or the opposing end are connected to a similar swash or angle plate angularly disposed in advanced or trailing relationship to the first mentioned swash or angle plate so that the exhaust port end of the cylinders will have its pistons uncover the exhaust ports in advance of the intake ports on their outward movement and likewise these pistons will return and cut off the exhaust ports in advance of the closing of the intake ports whereby proper supercharging will be possible through the intake ports after the closure of the exhaust ports. In another form of this invention only one wabble plate is used and adjacent cylinders are connected in pairs to give the effect of opposed pistons.

Other and further important objects of this invention will be apparent from the disclosures in the specification and the accompanying claims.

This invention (in a preferred form) is illustrated in the drawings and hereinafter more fully described.

On the drawings:

As shown on the drawings.

The engine illustrated is of the swash or wabble plate type sometimes aptly called a barrel engine. In the illustrated embodiment of Figures 1 to 7, the barrel or casing is built up of a number of cylindrical sections, each section embodying the parts for some one function of the engine. For clearness in what follows, these sections will be generically identified, starting at the left in Figure 1, as follows: A combined intake and discharge manifold 10 for a supercharger and having a carburetor mounting flange 11 is bolted to the end of a supercharger section 12 having a series of cylinders 13 parallel to a central main shaft 14. Next comes a swash plate chamber 15 which forms a shell-like spacer between the section 12 and a power cylinder section 16 which contains inserted sleeves 17 forming the power cylinders aligned with the supercharger cylinders, an intake passage 18 common to all the cylinders, double exhaust passages 19 each serving two cylinders, and a large water jacket space 20. The remaining right hand section 21 forms a second swash plate chamber 22 as well as an accessory drive section 23 embodying a main bearing 24 for the central shaft, which carries a helical gear 25 driving a vertical shaft inclosed in a housing 26 the lower end of which carries oil and water pumps 27 and 28 while the upper end drives a horizontal shaft 29 which has a flexible drive connection 30 to a magneto 31.

The power cylinder sleeves 17 are inserted in the power cylinder section 16 from both sides to form a continuous aligned bore, the sleeves being slightly separated at their inner ends to define a combustion chamber 32 having a spark plug 33 opening thereinto. The sleeves are duplicates and are provided with ports 34 opening into the intake and exhaust passages, the sleeves being provided with external flanges 35 at each side of the ports which flanges seat on gaskets 36 in recesses in the walls defining the intake and exhaust passages. These flanges and their corresponding gasket recesses are of course graduated in diameter to permit endwise entry of the sleeves into proper position in the section 16.

Separate aligned pistons 37 operated in each end of the cylinders formed by the aligned sleeves 17, these pistons in the smaller sizes being provided with circular or spiral grooves in lieu of the usual piston rings. These grooves collect and distribute oil in the cylinders and the oil in the grooves forms an efficient liquid seal. On the intake side, the piston, which will hereafter be called the intake piston, is connected by a piston rod 38 to pistons 39 operating in the supercharger cylinders 13, these pistons therefore forming cross-heads for their corresponding power pistons as well as utilizing part of the power stroke for pre-compressing future charges for the power cylinder.

The piston rods are provided with a cylindrical aperture 40 at right angles to their axis to receive slipper pistons 41 having miniature piston pins 42 pivotally connecting them to the end of arms 43 of swash or wabble plates 44 which are journalled on double row ball bearings 45, the inner race of which is mounted on a sleeve 46, the outer cylindrical surface 47 of which is at an acute angle to the main shaft 14 on which the sleeve is mounted. The wabble or swash plate is not eccentric to the shaft, the angular mounting thereon giving a back-and-fourth movement of the arms 43 comprising a harmonic movement resembling that of a slide directly actuated by a crank pin.

Figure 1:
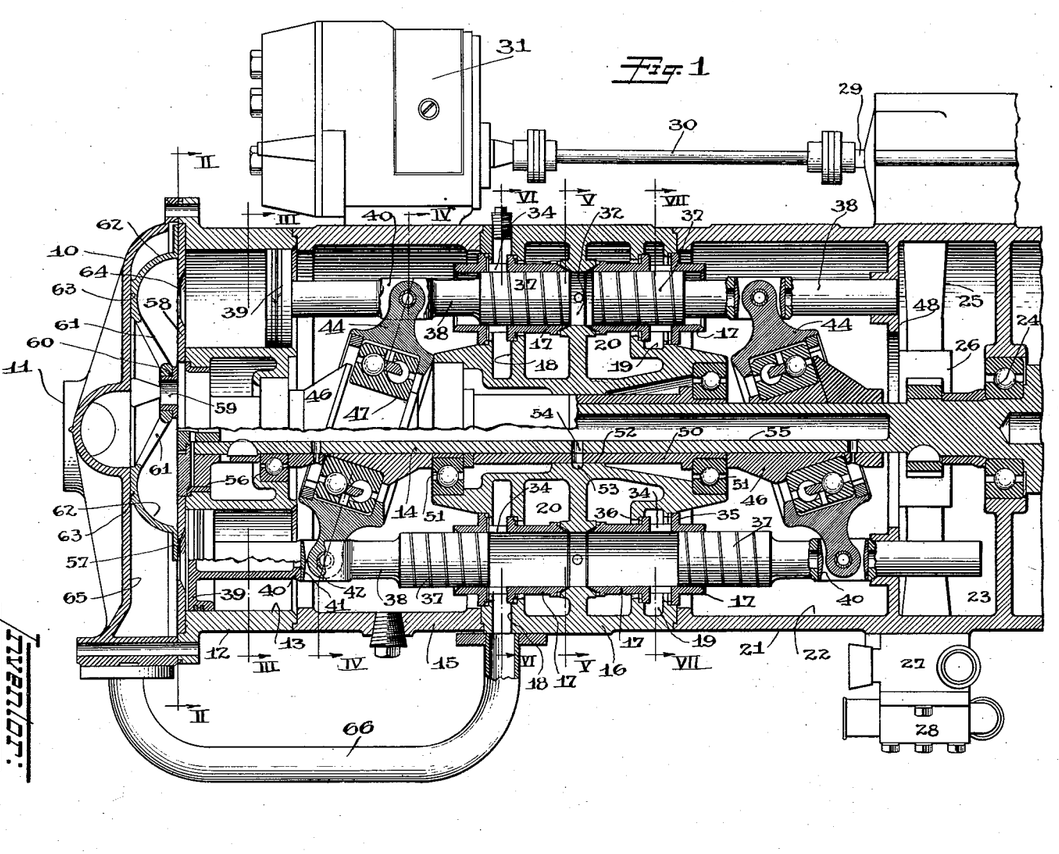
Figure 1 is a longitudinal vertical section through an engine embodying an illustrative form of this invention.
Figure 2:
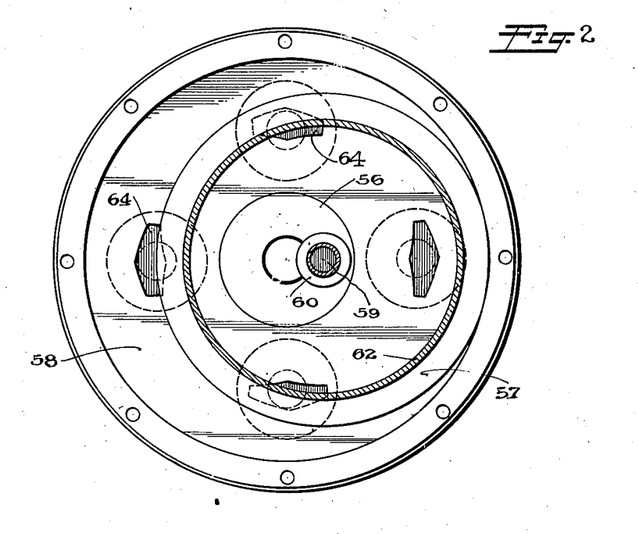
Figure 2 is a section on the line II—II of Figure 1 showing the compressor ports.
Figure 3:
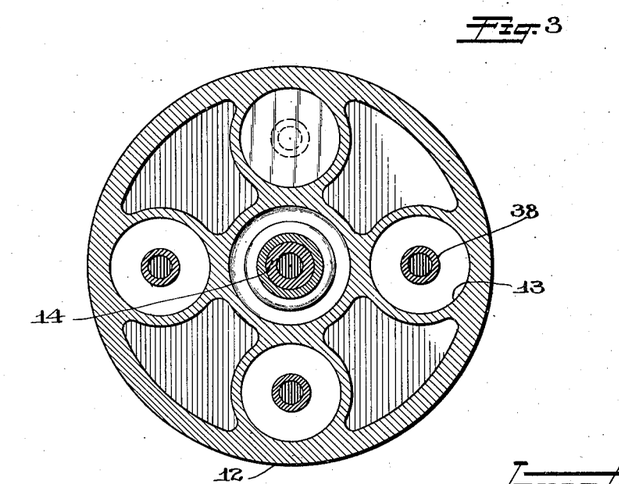
Figure 3 is a section on the line III—III of Figure 1, taken through the compressor cylinders.
Figure 4:
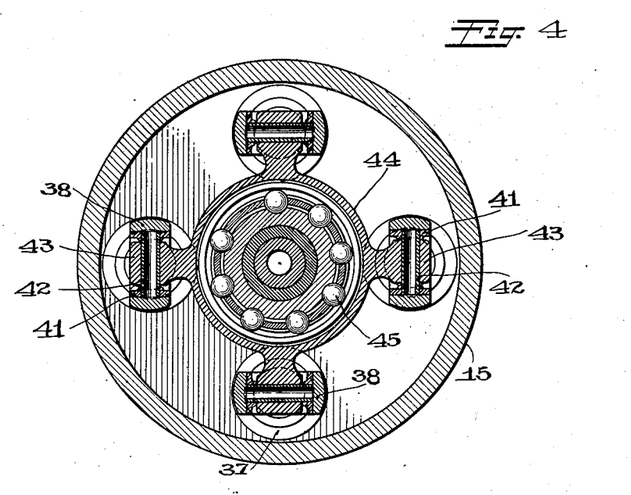
Figure 4 is a section along the axis of one wabble plate.
Figure 5:
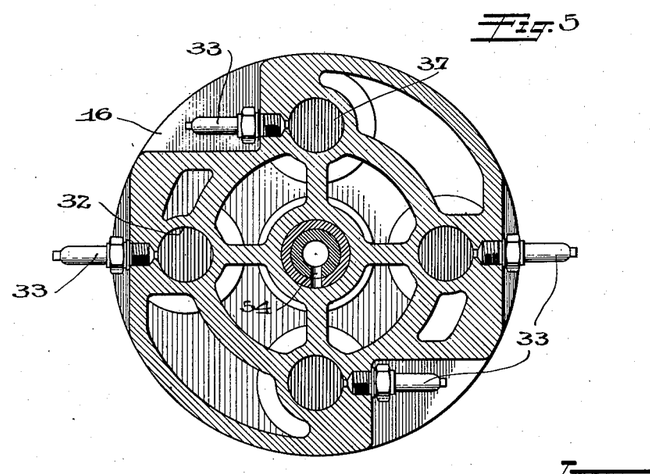
Figure 5 is a section comprising the combustion chambers.
Figures 6, 7:
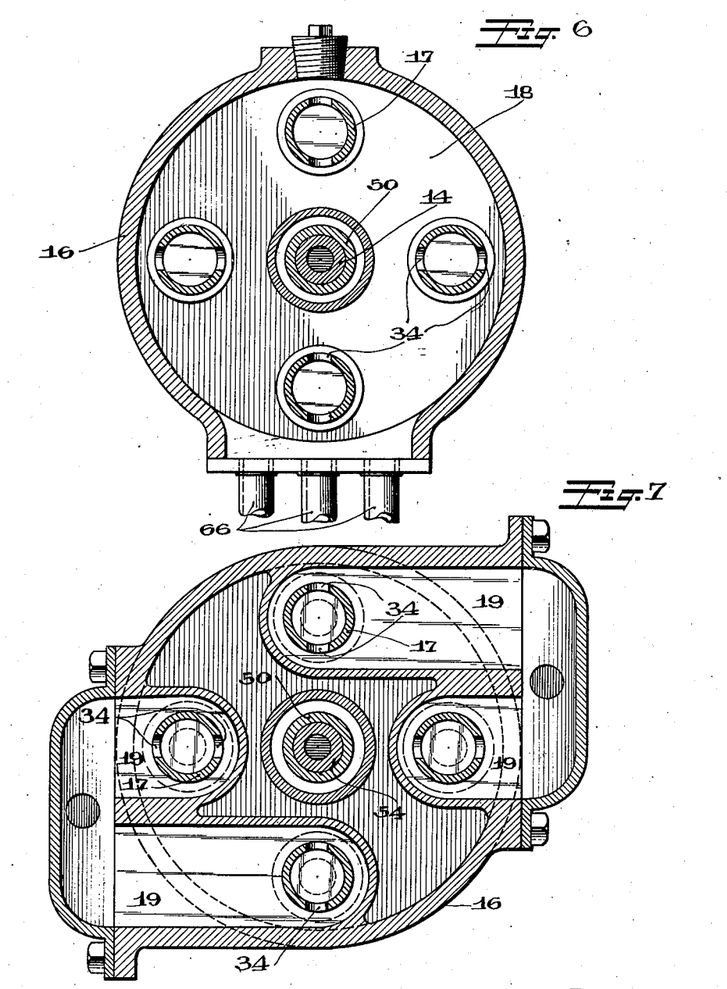
Figure 6 is a section through the intake ports and chest.
Figure 7 is a section through the exhaust ports.

The pistons in the exhaust ends of the power cylinders are similarly linked up by piston rods journalled at their outer ends in a partition 48, the rods being connected to a swash plate mounted on a sleeve timed approximately 180° from that on the intake side in order that the pistons will oppose each other; i. e. both travel inwardly towards each other to give, in effect, double the stroke of a single swash plate. As a further refinement, the exhaust swash plate is given a slight lead in advance of the 180° position relative to the intake swash plate in order that the exhaust piston may travel outwardly slightly in advance of the intake piston to uncover the exhaust port prior to uncovering the intake port, the initial opening of which causes a scavenging action by the incoming fuel and air mixture. As a result of this lead by the exhaust swash plate, the exhaust piston completes its outward movement and starts back to cover the exhaust port before the intake port is covered, so that the delayed closure of the latter permits a full supercharge from the intake passage, the volume of which acts as a fuel and air mixture chest to fully supercharge the power cylinder before the intake port is cut off by the piston. The upper cylinder section in Figure 1 shows that the exhaust piston has passed its inner center in advance of the intake piston dead center position. The main shaft 14 is surrounded by a sleeve 50 between the two swash plates and co-extensive with the power cylinder section 16, this sleeve being mounted at the ends in ball bearings 51. The central part of the sleeve has a plain bearing 52 in the section 16, an oil lead passage 53 supplying oil from the pump 27 to a radial hole 53 in the shaft, which is hollowed out at 55 to supply oil to the two swash plate bearings and to the supercharger valve plain bearing 56. The oil supplied to the swash plates works its way out as a spray or fog in the spaced compartments to lubricate the pistons and slipper bearings.

The bearing 56 is formed as a seal for the intake side of an annular flange 57 which floats over a plate 58 forming the cylinder heads of all the scavenging pump cylinders 13. A crankpin 59 is eccentrically mounted on the end of the main shaft 14 and engages a central bearing 60 having arched arms 61 connecting to a bowl-like shell 62 integral with the flange 57, the shell having a surface 63 bearing against the inside surface of the cover 10 to hold the flange 57 against the cover plate 58, the bowl-like shell acting as a partition between the intake or inside and the discharge or outside of the flange 57. A series of ports 64 are cut through the cover plate 58 and the eccentricity of the crank pin 59 is such that the flange alternately moves outside and inside the circle of ports, thus alternately placing each port in communication with the carbureter inlet 11 and the discharge or collecting chamber 65 in the cover 10 outside the bowl-like shell 62. This chamber 65 has a plurality of pipes 66 leading to the intake chamber 18 of the power cylinders, a number of pipes being used to obtain the maximum cooling effect to increase the weight of the charge for a given volume to increase the power developed by the engine. This intercooling effect permits the use of larger volumes in the supercharging cylinders without reaching the detonation range of the fuel as would be the case were the heat of compression in the supercharging cylinders carried directly into the power cylinder to be further increased by the compression therein.

In the operation of this form of the engine, the air entering the inlet 11 is initially carbureted in the usual way and passes inside the shell 62 to enter the ports 64 as the inner diameter of the flange 57 uncovers them during the eccentric movement thereof. The double valve so formed, comprising the shell 62 and flange 57, is free to rotate on the crank pin 59 although its normal motion would be an oscillation about the axis of the main shaft rather than a rotation about the pin, this freedom of movement tending to materially reduce the friction in the valve motion. At the same time that some of the ports 64 are in communication with the inlet 11, others diametrically opposite thereto are discharging into the chamber 65 as will be seen in Figures 1 and 2. This chamber 65 is in direct communication with the intake passage 18 which forms a supply chest for the intake ports 34 in the power cylinders. In Figure 1 the lower cylinder is taking in its charge of fuel and air through the ports 34 while the exhaust ports in the upper cylinder are also open to discharge the spent gases from the preceding power stroke. The fresh entering mixture acts to assist in scavenging the exhaust gases and the ports are proportioned so that the exhaust ports are closed by the returning exhaust piston 17 by the time the entering fresh charge reaches these ports. Due to the lead given the exhaust pistons, the intake remains open for a short period after the cutting off of the exhaust ports to fully supercharge the engine.

Figure 8:
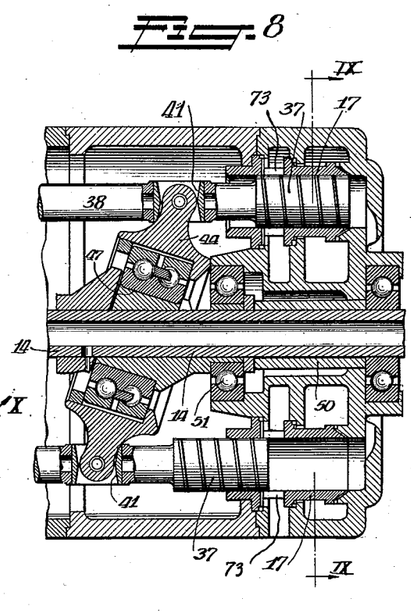
Figure 8 is a longitudinal section of a modified form of this invention.
Figures 9, 10:
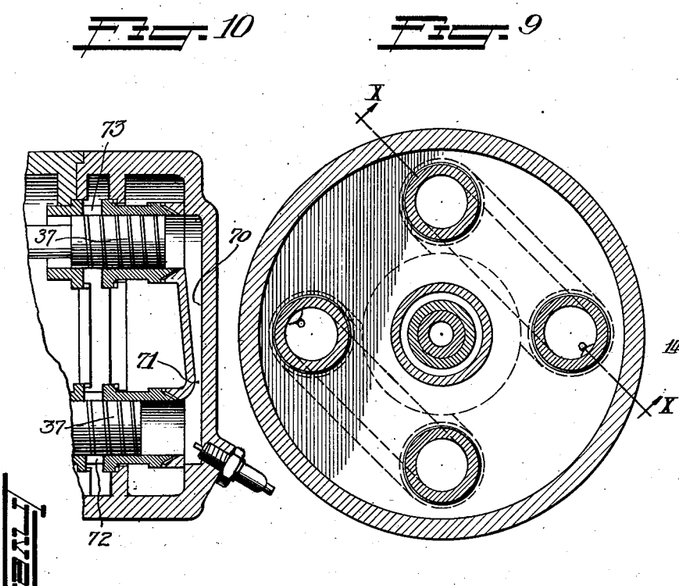
Figure 9 is a section on the line IX—IX of Figure 8.
Figure 10 is a section on the line X—X of Figure 9.

The modified or U type of combustion chamber shown in Figures 8 to 10 utilizes a single swash plate 44 mounted on the main shaft 14 the swash plate operating pistons 37 by means of slipper pistons 41 which slide in piston rods 38, this structure being identical with that previously described with the use of a combustion chamber 70 connecting two adjacent cylinders and having a venturi like restriction 71 preferably adjacent the inlet cylinder into which a spark plug projects, the venturi 71 causing stratification or separation of the incoming mixture from the exhaust gases, as well as holding the richer part of the combustible charge adjacent the spark plug. The inlet cylinders, the lower one in Figure 10, are provided with intake ports 72 and the exhaust cylinders are provided with ports 73 as before.

Due to the lead given the exhaust cylinders for a clockwise rotation because of the swash plate, the effective period of maximum pressure in the compression chamber is held substantially constant from the time the exhaust piston reaches its extreme inner position in the cylinder until the inlet piston likewise reaches its extreme position after a given rotation of the main shaft depending on the spacing between cylinders operating in pairs. It is not essential to equally space the cylinders, as it might be desirable to arrange the spacing with consideration for the out of phase piston and port actions, in which case each pair of cylinders would have the same spacing. The ignition of the charge can occur anywhere within this period, preferably earlier for higher speeds. If the ignition is timed to follow the top dead center of the exhaust piston this piston will begin its outward travel while the bulk of the combustible mixture is in the inlet cylinder and is being pushed out by the continued advance of the inlet piston. Because of the lead thus given the exhaust piston the exhaust ports will be uncovered substantially in advance of the inlet ports in the other cylinder, allowing the pressure to drop before the inlet ports are uncovered, admitting the new compressed combustible charge which acts to scavenge or push out the exhaust gases. The exhaust ports are so proportioned so that in combination with the lead given the exhaust piston, the latter cuts off these ports by the time the new charge has swept through the cylinder spaces thus preventing waste of fuel. It will thus be seen that the paired cylinders operated by a single swash plate achieve the result obtained by an angular offset of the two swash plates in the opposed piston form of this invention first described.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A barrel type internal combustion engine comprising a main shaft, a plurality of cylinders arranged parallel to the main shaft, said cylinders having intake and exhaust ports at opposite ends thereof, intake and exhaust connections therefor, a pair of opposed pistons in each cylinder, one piston controlling the exhaust port and the other controlling the intake port, a swash plate connected to each of the exhaust pistons and journaled at an angle on said shaft, a second swash plate connected to each of the intake pistons and similarly journalled on said main shafts, the exhaust and intake swash plates being angularly offset on said main shaft in such a manner as to cause the exhaust pistons to uncover and cover the exhaust ports slightly in advance of the similar cycles of the intake ports, supercharger cylinders at one end of and aligned with said power cylinders, pistons in said supercharger cylinders connected to the adjacent power pistons, and an eccentrically movable valve for said supercharger cylinders adapted to control both the intake and discharge through a single port for each cylinder.

2. A barrel type internal combustion engine comprising a main shaft, a plurality of cylinders arranged parallel to the main shaft, said cylinders having intake and exhaust ports at opposite ends thereof, intake and exhaust connections therefor, a pair of opposed pistons in each cylinder, one piston controlling the exhaust port and the other controlling the intake port, a swash plate connected to each of the exhaust pistons and journaled at an angle on said main shaft, a second swash plate connected to each of the intake pistons and similarly journaled on said main shafts, supercharger cylinders at one end of and aligned with said power cylinders, and pistons in said supercharger cylinders connected to adjacent power pistons, and an eccentrically movable valve for said supercharger cylinders adapted to control both the intake and discharge through a single port for each cylinder.

3. A barrel type internal combustion engine comprising a main shaft, a plurality of cylinders arranged parallel to the main shaft, said cylinders having intake and exhaust ports at opposite ends thereof, intake and exhaust connections therefor, a pair of opposed pistons in each cylinder, one piston controlling the exhaust port and the other controlling the intake port, a swash plate connected to each of the exhaust pistons and journaled at an angle on said shaft, a second swash plate connected to each of the intake pistons and similarly journaled on said main shafts, the exhaust and intake swash plates being angularly offset on said main shaft in such a manner as to cause the exhaust pistons to uncover and cover the exhaust ports in advance of the similar cycles of the intake ports, supercharger cylinders at one end of and aligned with said power cylinders, pistons in said supercharger cylinders connected to the adjacent power pistons, an eccentrically movable valve for said supercharger cylinders adapted to control both the intake and discharge through a single port for each cylinder, and a plurality of connections leading from said supercharger cylinders to said intake connections.

4. A barrel type internal combustion engine comprising a main shaft, a plurality of cylinders arranged parallel to the main shaft, said cylinders having intake and exhaust ports at opposite ends thereof, intake and exhaust connections therefor, a pair of opposed pistons in each cylinder, one piston controlling the exhaust port and the other controlling the intake port, a swash plate connected to each of the exhaust pistons and journaled at an angle on said main shaft, a second swash plate connected to each of the intake pistons and similarly journaled on said main shafts, supercharger cylinders at one end of and aligned with said power cylinders, pistons in said supercharger cylinders connected to adjacent power pistons, an eccentrically movable valve for said supercharger cylinders adapted to control both the intake and discharge through a single port for each cylinder, and a plurality of connections leading from said supercharger cylinders to said intake connections.

5. A swash plate internal combustion engine comprising a shaft, power cylinders arranged about said shaft and parallel thereto, said cylinders having intake and exhaust ports adjacent the ends thereof, pairs of opposed pistons in each cylinder adapted to uncover said ports at the outer portion of their travel, separate swash plates for the pistons in each end of the power cylinders, supercharging cylinders aligned with the power cylinders, pistons therein connected to one set of the pistons in the power cylinders, and an eccentrically movable valve separating the intake and discharge of the supercharging cylinders.

6. A swash plate internal combustion engine comprising a shaft, power cylinders arranged about said shaft and parallel thereto, said cylinders having intake and exhaust ports adjacent the ends thereof, pairs of opposed pistons in each cylinder adapted to uncover said ports at the outer portion of their travel, separate swash plates for the pistons in each end of the power cylinders, superchanging cylinders aligned with the power cylinders, pistons therein connected to one set of the pistons in the power cylinders, a plurality of connections leading from said supercharger cylinders to said intake connections, and an eccentrically movable valve separating the intake and discharge of the supercharging cylinders.

7. A swash plate internal combustion engine comprising a shaft, power cylinders arranged about said shaft and parallel thereto, said cylinders having intake and exhaust ports adjacent the ends thereof, pairs of opposed pistons in each cylinder adapted to uncover said ports at the outer portion of their travel, separate swash plates for the pistons in each end of the power cylinders, supercharging cylinders aligned with the power cylinders, pistons therein connected to one set of the pistons in the power cylinders, and a valve for said supercharger cylinders adapted to alternately connect a single port in each supercharger cylinder with both the intake and discharge passages thereto and therefrom.

8. A swash plate internal combustion engine comprising a shaft, power cylinders arranged about said shaft and parallel thereto, said cylinders having intake and exhaust ports adjacent the ends thereof, pairs of opposed pistons in each cylinder adapted to uncover said ports at the outer portion of their travel, separate swash plates for the pistons in each end of the power cylinders, the exhaust and intake swash plates being angularly offset on said main shaft in such a manner as to cause the exhaust pistons to uncover and cover the exhaust ports slightly in advance of the similar cycles of the intake ports, supercharging cylinders aligned with the power cylinders, pistons therein connected to one set of the pistons in the power cylinders, and a valve for said supercharger cylinders adapted to alternately connect a single port in each supercharger cylinder with both the intake and discharge passages thereto and therefrom.

9. A swash plate internal combustion engine comprising a shaft, power cylinders arranged about said shaft and parallel thereto, said cylinders having intake and exhaust ports adjacent the ends thereof, pairs of opposed pistons in each cylinder adapted to uncover said ports at the outer portion of their travel, separate swash plates for the pistons in each end of the power cylinders, supercharging cylinders aligned with the power cylinders, pistons therein connected to one set of the pistons in the power cylinders, a valve for said supercharger cylinders adapted to alternately connect a single port in each supercharged cylinder with both the intake and discharge passages thereto and therefrom, and a plurality of connections leading from said supercharger cylinders to said intake connections.

10. A swash plate internal combustion engine comprising a shaft, power cylinders arranged about said shaft and parallel thereto, said cylinders having intake and exhaust ports adjacent the ends thereof, pairs of opposed pistons in each cylinder adapted to uncover said ports at the outer portion of their travel, separate swash plates for the pistons in each end of the power cylinders, the exhaust and intake swash plates being angularly offset on said main shaft in such a manner as to cause the exhaust pistons to uncover and cover the exhaust ports slightly in advance of the similar cycles of the intake ports, supercharging cylinders aligned with the power cylinders, pistons therein connected to one set of the pistons in the power cylinders, a valve for said supercharger cylinders adapted to alternately connect a single port in each supercharger cylinder with both the intake and discharge passages thereto and therefrom, and a plurality of connections leading from said supercharger cylinders to said intake connections.

11. A supercharged internal combustion engine comprising a main shaft, power cylinders arranged parallel to said shaft, reciprocating pistons in said power cylinders, means connecting said pistons to said main shaft adapted to convert the reciprocating motion of the pistons into a rotary motion of the main shaft, compressor cylinders aligned with the power cylinders, pistons therein connected to the pistons in said power cylinders, and an eccentrically movable valve common to said compressor cylinders adapted to alternately establish communication between said compressor cylinders and the intake and discharge passages thereto and therefrom.

12. An internal combustion engine supercharger comprising in combination with the power cylinders and pistons of said engine, compressor cylinders aligned with the power cylinders, pistons therein, rods connecting the power cylinder pistons with the compressor pistons, and an eccentrically movable valve common to said compressor cylinders adapted to alternately establish communication between said compressor cylinders and the intake and discharge passages thereto and therefrom.

13. A swash plate internal combustion engine comprising a shaft, power cylinders arranged about said shaft and parallel thereto, said cylinders having intake and exhaust ports adjacent the outer ends thereof, pistons in each cylinder adapted to uncover said ports at the outer portion of their travel, swash plates interconnecting said pistons, compressor cylinders aligned with the power cylinders, pistons therein connected to the pistons in the power cylinders, and an eccentrically movable valve common to said compressor cylinders adapted to alternately establish communication between said compressor cylinders and the intake and discharge passages thereto and therefrom.

14. A swash plate internal combustion engine comprising a shaft, power cylinders arranged about said shaft and parallel thereto, alternate cylinders having intake and exhaust ports adjacent the outer ends thereof, the cylinders being connected in pairs by a common combustion chamber, pistons in each cylinder adapted to uncover said ports at the outer portion of their travel, and swash plates interconnecting said pistons.

15. A swash plate internal combustion engine comprising a shaft, power cylinders arranged about said shaft and parallel thereto, alternate cylinders having intake and exhaust ports adjacent the outer ends thereof, the cylinders being connected in pairs by a common combustion chamber, pistons in each cylinder adapted to uncover said ports at the outer portion of their travel, swash plates interconnecting said pistons, compressor cylinders aligned with the power cylinders, and pistons therein connected to the pistons in the power cylinders.

16. A swash plate internal combustion engine comprising a shaft, power cylinders arranged about said shaft and parallel thereto, alternate cylinders having intake and exhaust ports adjacent the outer ends thereof, the cylinders being connected in pairs by a common combustion chamber having a restricted passage between the pairs of cylinders so connected, pistons in each cylinder adapted to uncover said ports at the outer portion of their travel, and swash plates interconnecting said pistons.

17. A swash plate internal combustion engine comprising a shaft, power cylinders arranged about said shaft and parallel thereto, alternate cylinders having intake and exhaust ports adjacent the outer ends thereof, the cylinders being connected in pairs by a common combustion chamber having a restricted passage between the pairs of cylinders so connected, pistons in each cylinder adapted to uncover said ports at the outer portion of their travel, swash plates interconnecting said pistons, compressor cylinders aligned with the power cylinders, and pistons therein connected to the pistons in the power cylinders.

18. An internal combustion engine, comprising a shaft, a swash plate mounted on said shaft, and a pair of cylinders arranged parallel with said shaft and having a common combustion head, one of said cylinders having an intake port and the other having an exhaust port, and pistons in said cylinders applying a thrust against said swash plate.

19. An internal combustion engine, comprising a shaft, a swash plate mounted on said shaft, a plurality of pairs of cylinders arranged around said shaft and parallel thereto, each pair of cylinders having a common combustion head and one cylinder of each pair having an intake port and the other having an exhaust port, pistons arranged in each of said cylinders, and piston rods operatively engaging said swash plate.

In testimony whereof I have hereunto subscribed my name at Indianapolis, Marion County, Indiana.

LEE OLDFIELD.